(12) United States Patent
Okada et al.

(10) Patent No.: US 6,794,063 B2
(45) Date of Patent: Sep. 21, 2004

(54) THIN FILM MAGNETIC HEAD AND METHOD OF FABRICATING THE HEAD

(75) Inventors: Yasuyuki Okada, Odawara (JP); Kazue Kudo, Odawara (JP); Hiroyuki Hoshiya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/153,618

(22) Filed: May 24, 2002

(65) Prior Publication Data

US 2002/0192503 A1 Dec. 19, 2002

(30) Foreign Application Priority Data

May 24, 2001 (JP) ........................................ 2001-155855

(51) Int. Cl.$^7$ ........................ G11B 5/147; G11B 5/127; G11B 5/21; C25D 5/18
(52) U.S. Cl. ...................... 428/692; 428/900; 205/119; 205/170; 205/255; 360/110; 360/125; 360/126
(58) Field of Search ................................. 360/110, 125, 360/126

(56) References Cited

U.S. PATENT DOCUMENTS

| | | | | |
|---|---|---|---|---|
| 6,120,918 | A | * | 9/2000 | Osaka et al. ................ 428/692 |
| 6,507,464 | B1 | * | 1/2003 | Ohashi et al. ............... 360/317 |
| 2002/0106532 | A1 | * | 8/2002 | Yazawa et al. .............. 428/692 |
| 2003/0044303 | A1 | * | 3/2003 | Chen et al. .................... 420/7 |

FOREIGN PATENT DOCUMENTS

| | | |
|---|---|---|
| JP | 2-69906 | 3/1990 |
| JP | 6-89422 | 3/1994 |
| JP | 6-346202 | 12/1994 |
| JP | 7-34891 | 1/1995 |
| JP | 2821456 | 8/1998 |

OTHER PUBLICATIONS

Liu & Zangari, "Electrodeposition of soft, high moment Co–Fe–Ni thin films," Journal of Applied Physics, vol. 87, No. 9, May 1, 2000.*
Liu & Zangari, "High Moment FeCoNi Thin Films Fabricated by Pulsed Current Electrodeposition," IEEE Transactions on Magnetics, vol. 37, No. 4, Jul. 2001.*
Atomic Structure of Ferromagnetic Materials, pp. 440–441.
S. Liao, "High Moment CoFe Thin Films by Electrodeposition", IEEE Transactions on Magnetics, vol. MAG–23, No. 5, Sep. 1987.

* cited by examiner

*Primary Examiner*—Paul Thibodeau
*Assistant Examiner*—Nikolas J. Uhlir
(74) *Attorney, Agent, or Firm*—Antonelli, Terry, Stout & Kraus, LLP

(57) ABSTRACT

The present invention provides a thin film magnetic head having sufficient recording performance on a recording medium imparted with a large coercive force. According to the present invention, a plated magnetic thin film can be obtained in which a crystal grain size is modulated in a film thickness direction and a coercive force is reduced. Further, according to the present invention, even for a composition area indicating a high saturation magnetic flux density in which, conventionally, soft magnetic properties could not be obtained, magnetic film having an excellent soft magnetic property can be manufactured.

8 Claims, 9 Drawing Sheets

THIN FILM MAGNETIC HEAD AND METHOD OF FABRICATING THE HEAD

BACKGROUND OF THE INVENTION

1. Field of the Invention

The present invention relates to a thin film magnetic head, a method of fabricating the same, and a magnetic recording device, in particular to an induction-type thin film magnetic head used for a recording unit of a magnetic head with write and read elements which enables recording at a high recording density.

2. Description of Related Art

Accompanying increases in the recording densities of magnetic disk apparatuses, there is a need for thin film magnetic heads having sufficient recording ability on a recording medium imparted with a large coercive force. Such magnetic heads are required to be composed of a material having a high saturation magnetic flux density (Bs) as a magnetic core material. As alloys which have a high Bs of 2.0 T or more and which can be produced by a wet film formation process used in a head core production process, alloys such as Co—Fe and Co—Ni—Fe are known. For example, in IEEE Trans. Magn., vol. 23, p. 2981, there is a description on a Co—Fe alloy having a Bs of 1.9 T for which film formation was carried out by an electroplating method. Further, a Co—Ni—Fe ternary soft magnetic thin film is disclosed and suggested in, for example, Japanese Patent Application Laying-Open Nos. 6-89422 and 6-346202. In particular, Japanese Patent No. 2821456 discloses that a ternary alloy film comprising 40 to 70% by weight Co, 10 to 20% by weight Ni, and 20 to 40% by weight Fe, is formed from a plating bath free of a stress relaxation agent, thereby producing a soft magnetic thin film having a high Bs of 1.9 T or more. Furthermore, in "Ferromagnetism" by R. M. Bozorth (D. Van Nostrand Co., Inc., N.Y., (1951) p. 441) there is a description on the physical properties of an Fe—Co alloy having a high Bs which was produced by a sputtering method.

In order to realize a magnetic disk apparatus having a high recording density, a magnetic head core material with a high Bs should be used. In addition, in order to observantly keep pace with changes in induced current due to recording current, the coercive force (Hc) of the core material must be as small as possible. Moreover, as a recording track width becomes narrower, the aspect ratio of a resist frame tends to become larger. Thus, to uniform a film in the resist frame it is necessary to produce a magnetic head core using a wet film formation process, typically represented by plating.

A composition area having a high Bs in an alloy containing Co, Ni and Fe is an area having a body-centered cubic (bcc) structure as a crystal structure. However, in general, since magnetocrystalline anisotropy is large for an alloy of bcc phase, and the alloy tends to have a larger crystal grain size, and crystal grain size and Hc are strongly related due to crystal symmetry, it is impossible to obtain a sufficiently soft magnetic property suitable for a magnetic head.

Japanese Patent Application Laying-Open No. 2-69906 describes that a Co—Fe soft magnetic film of a bcc phase was manufactured by a sputtering method and that a good soft magnetic property of Hc=2Oe was obtained. However, because its Bs is low at 1.9 T it is inadequate for use as a recording head material designed for high-density recording. Further, while Japanese Patent Application Laying-Open No. 7-3489 describes a Co—Ni—Fe alloy having a low Hc of 0.5 Oe or less, due to its composition containing a face-centered cubic (fcc) structure, it cannot be expected to have a high Bs.

As is clear from the above-mentioned known references, it has been difficult to select a material having a high Bs and small Hc that is applicable in a recording head core fabrication process. An object of the present invention is, accompanying the increasing recording densities of magnetic disk apparatuses, to provide a thin film magnetic head having sufficient recording performance on a recording medium imparted with a large coercive force, and a magnetic disk apparatus using the same.

SUMMARY OF THE INVENTION

Heretofore, there have been many reports which suggest that a composition area having a high Bs and a substantial bcc structure has insufficient soft magnetic properties.

According to the present invention, in an electroplating method, by applying a higher potential at an initial stage of the plating at a current density that is 5 times or more higher than usual and performing formation of a magnetic film with modulation of the potential at a film formation stage, it is possible to obtain a plated film having a crystal grain size modulated in the direction of film thickness, thus enabling reduction of Hc. According to this method, a magnetic thin film having a high Bs and an excellent soft magnetic property can be obtained.

It is generally known that the crystal grain of a plated film becomes fine by conducting plated film formation under a mass transfer rate-determining condition, such as in a method in which plating is performed at a high current density. However, as there are many crystal grain boundaries, a drawback exists in that corrosion resistance of a film cross section is inferior.

Further, even when films having different crystal grain sizes are laminated to perform the modulation of crystal grain size in the direction of film thickness, because of the formation of a plurality of layer boundary faces with different grain sizes in the plating, in a similar manner, the corrosion resistance of the film cross section is inferior, particularly with regard to a multi-layered film obtained by laminating a Co—Ni—Fe plated film.

Therefore, by modulating a crystal grain size in the direction of film thickness and enhancing soft magnetic properties with fine crystal grains at an initial stage of plating, it is expected that, for a Co—Ni—Fe film in a composition area of bcc phase, which has a large Hc that is likely to result in a rough crystal grain, the Hc can be reduced. Thus, it is possible to obtain a magnetic thin film having excellent soft magnetic properties and excellent corrosion resistance, while retaining a high Bs.

A thin film magnetic head according to the present invention comprises: a lower magnetic core; an upper magnetic core which is opposed to the lower magnetic core through a magnetic gap at a tip portion and connected to the lower magnetic core at a rear portion; and a coil magnetically connected to a magnetic circuit formed of the lower and upper magnetic cores. The thin film magnetic head is characterized in that at least a part of the lower and/or the upper magnetic core contains Co, Ni and Fe, and that the thin film magnetic head further comprises a plated magnetic film wherein the crystal grain size is modulated in the direction of film thickness. Herein, a structure wherein the crystal grain size is modulated in the direction of film thickness means a structure wherein the crystal grain size changes seamlessly or gradually towards the direction of a surface side from a substrate side of the plated film. A structure wherein a crystal shape changes can also be regarded as modulation of crystal grain size.

The plated magnetic film comprises not less than 25% by weight of Fe, not greater than 80% by weight of Co, and not greater than 20% by weight of Ni, and the crystal structure of the magnetic film is substantially a body-centered cubic structure. As can be seen from the relationship between Bs and composition of the Co—Ni—Fe magnetic film shown in FIG. 1, the magnetic films in this composition area have a saturation magnetic flux density of 2.0 T or more.

The plated magnetic film can be formed on an underlayer comprising a sputtered film containing Co, Ni and Fe. The formation of a plated magnetic film on such a underlayer allows a magnetic property of a magnetic core to be improved.

The sulfur content of the plated magnetic film is preferably not greater than 0.1% by weight. If the sulfur content exceeds 0.1% by weight, Bs will be decreased.

A method of fabricating the thin film magnetic head according to the present invention comprises the steps of: forming a lower magnetic core on a substrate; forming a coil; and forming an upper magnetic core which is opposed to the lower magnetic core through a magnetic gap film at a tip portion, connected to the lower magnetic core at a rear portion, and is magnetically connected to the coil together with the lower magnetic core. The method is characterized in that in the steps of forming the lower magnetic core and/or forming the upper magnetic core, a plated magnetic film containing Co, Ni and Fe is formed such that crystal grains have a grain size modulated in the direction of film thickness.

The plated magnetic film can be formed by electroplating in which current value or potential is modulated continually, gradually or periodically. When direct current is used as plating current, the plating current density is from 50 to 1000 $A/m^2$ and film formation is carried out under a plating current 5 times or more higher than the conventional magnetic film plating condition. In particular, at an initial stage of the plating process, a high plating potential is applied. Thereafter, the potential is modulated so as to become low, to thereby enable obtainment of a structure in which the crystal grain size is modulated in the direction of film thickness. However, this is only one example of such a method, and even if the crystal grain size is modulated by a method other than the above, it does not go against the subject-matter of the present invention.

A plating bath of electroplating may contain saccharin sodium as a stress relaxation agent. Saccharin sodium has a stress relaxation effect on a plated film while retaining a high Bs, and thus a high physical stability is obtainable.

The thin film magnetic head of the present invention is optimum for use as an induction-type magnetic recording head of a thin film magnetic head with write and read elements, in which a magnetoresistive element and an induction-type magnetic head are used as a read element and a write element, respectively.

According to the present invention, a magnetic film is formed by electroplating in which potential is modulated in a plated film formation process so that the crystal grain size of the magnetic film is modulated in the direction of film thickness, to thus enable the Hc of a Co—Ni—Fe plated film in a bcc composition area to be reduced. Further, when a magnetic head is manufactured using this plated magnetic film, a magnetic disk apparatus having a high recording density can be obtained.

DESCRIPTION OF THE PREFERRED EMBODIMENTS

Figure 1:
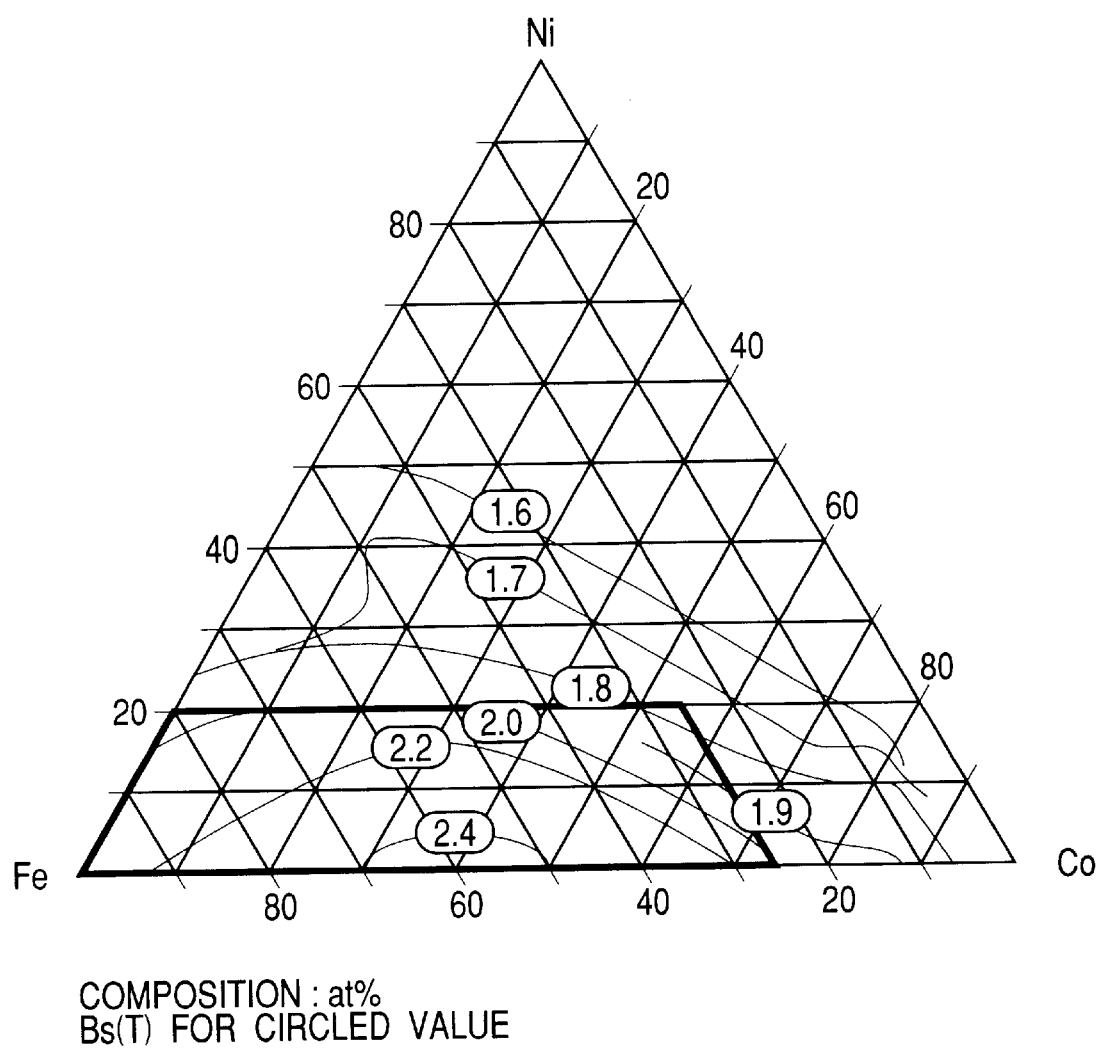
FIG. 1 is a view illustrating the relationship between composition of a Co—Ni—Fe magnetic film and Bs.

Referring to the drawings, the embodiments of the present invention will be described in detail below.

Embodiment 1

Table 1 shows one example of a composition of an electroplating bath used in the present invention. The electroplating bath contained $CoSO_4.7H_2O$, $NiSO_4.6H_2O$, $NiCl_2.6H_2O$, and $FeSO_4.5H_2O$ as ion sources for Co, Ni, and Fe, sodium chloride as an electrolyte, boric acid as a pH buffer, and saccharin sodium as a stress relaxation agent. The electrolyte enhances conductivity of the plating bath, and the pH buffer restrains pH fluctuation of the bath itself at a plating stage. These may be replaced with other substances having the same functions, such as ammonium sulfate as the electrolyte.

Additionally, the electroplating bath may optionally contain a brightener such as sodium lauryl sulfate, which is generally used for plating.

TABLE 1

| Chemical agent | Addition (g/L) |
| --- | --- |
| $CoSO_4.7H_2O$ | 17.8 |
| $FeSO_4.5H_2O$ | 7.5 |
| $NiSO_4.6H_2O$ | 6.0 |
| $NiCl_2.6H_2O$ | 6.0 |
| saccharin sodium | 1.5 |
| sodium chloride | 25.0 |
| boric acid | 25.0 |

In this embodiment, the concentrations of boric acid and sodium chloride were constant, and an amount of each ion directly involved in plated film formation was changed within the following ranges for investigation: Co ion 3.5 to 10 g/L, Ni ion 8.0 to 10 g/L, and Fe ion 0.3 to 3.0 g/L. Direct current was used as plating current, and the current density was varied within the range of 50 to 1000 $A/m^2$. In particular, in an initial stage of plating, a high potential was applied and the results thereof were investigated. A current waveform to be used includes not only direct current, but also includes on-off current as well as a pulse waveform which can modulate plating current. In addition, a pH value was changed for investigation within the range of 2.8 to 3.8.

As a plating substrate, a glass substrate was used which had been formed with a Co—Ni—Fe (100 nm)/NiCr (5 nm) film as an underlayer. In preparing the plating substrate, 5 nm of NiCr film was formed on the glass substrate by sputtering method with NiCr as the target, on top of which 100 nm of Co—Ni—Fe film was formed by sputtering method with Co—Ni—Fe as the target. The substrate is not limited to a glass substrate and may be any material, as long as it has sufficient resistance to plated film stress. Further, the NiCr layer was formed for the purpose of improving adhesion of the underlayer for plating, and it may be replaced with a similar material.

Also, at the time of plated film formation, an external magnetic field of about 24 kA/m (300 Oe) was applied in an in-plane direction so as to impart anisotropy.

Below, conditions for preparing these films are explained in detail.

Figure 2:
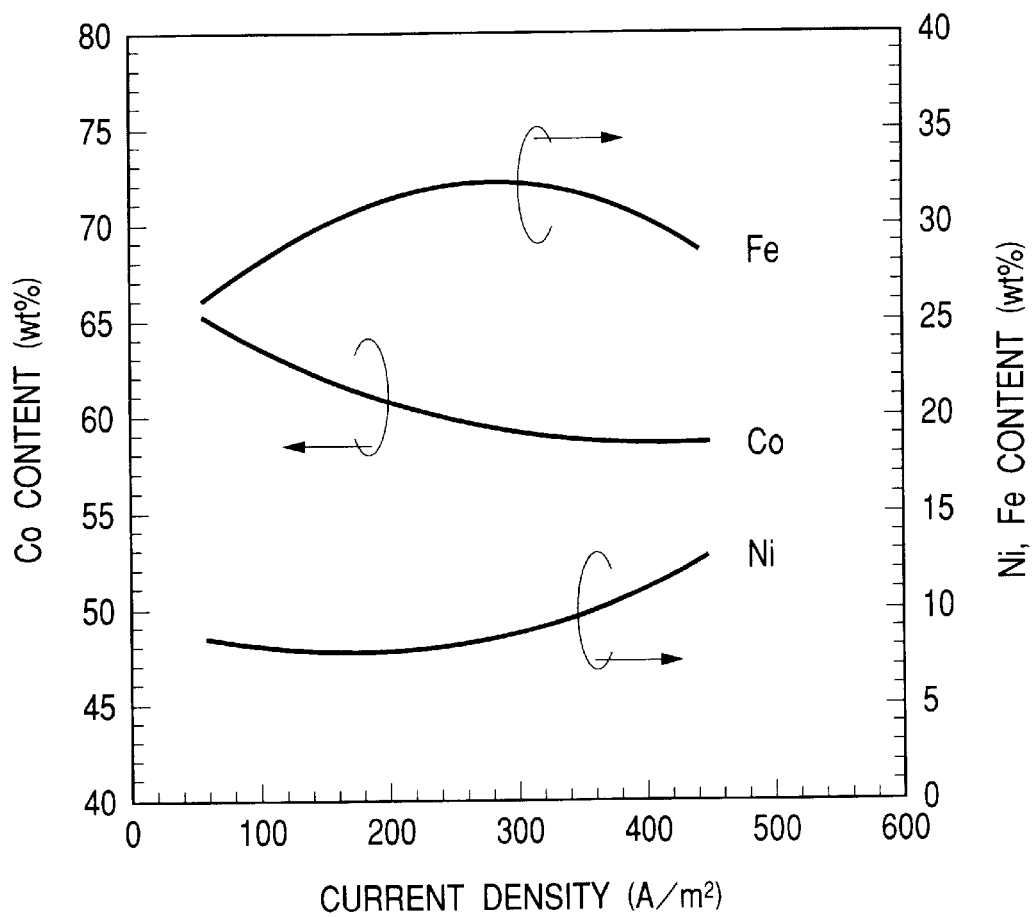
FIG. 2 is a graph illustrating behavioral changes of film composition prepared in accordance with current density in a single bath.

Using a plating bath having the composition shown in Table 1, a Co—Ni—Fe plated film was formed by changing current density so as to have a film thickness of 1.0 μm. FIG. 2 shows behavioral changes of the plated film composition according to current density, which will now be explained. In the current density range of 50 to 500 A/m$^2$, as the current density increased, Co decreased by 5% by weight, while Ni increased by 6% by weight. The Fe content reached a peak at 300 A/m$^2$, having a variation range of 7% by weight. Therefore, there was almost no change in the composition in the single bath even when the current density was changed.

Among the plated films formed by changing the current density, a plated film roughly having a composition range of 58 to 60% by weight of Co, 8 to 10% by weight of Ni, and 30 to 32% by weight of Fe, was observed using a transmission electron microscope (TEM) with respect to the crystal grain size in the vicinity of the film surface and in a cross sectional direction, and variations in the crystal grain size in accordance with current density were confirmed. Here, the crystal grain size represents an average value calculated from values obtained by measuring the size of crystal grains included in an imaging range of a TEM image.

Figure 3A:
FIGS. 3A to 3C show TEM (transmission electron microscope) images of plated films manufactured at different current densities.
Figure 3B:
Figure 3C:
Figure 4:
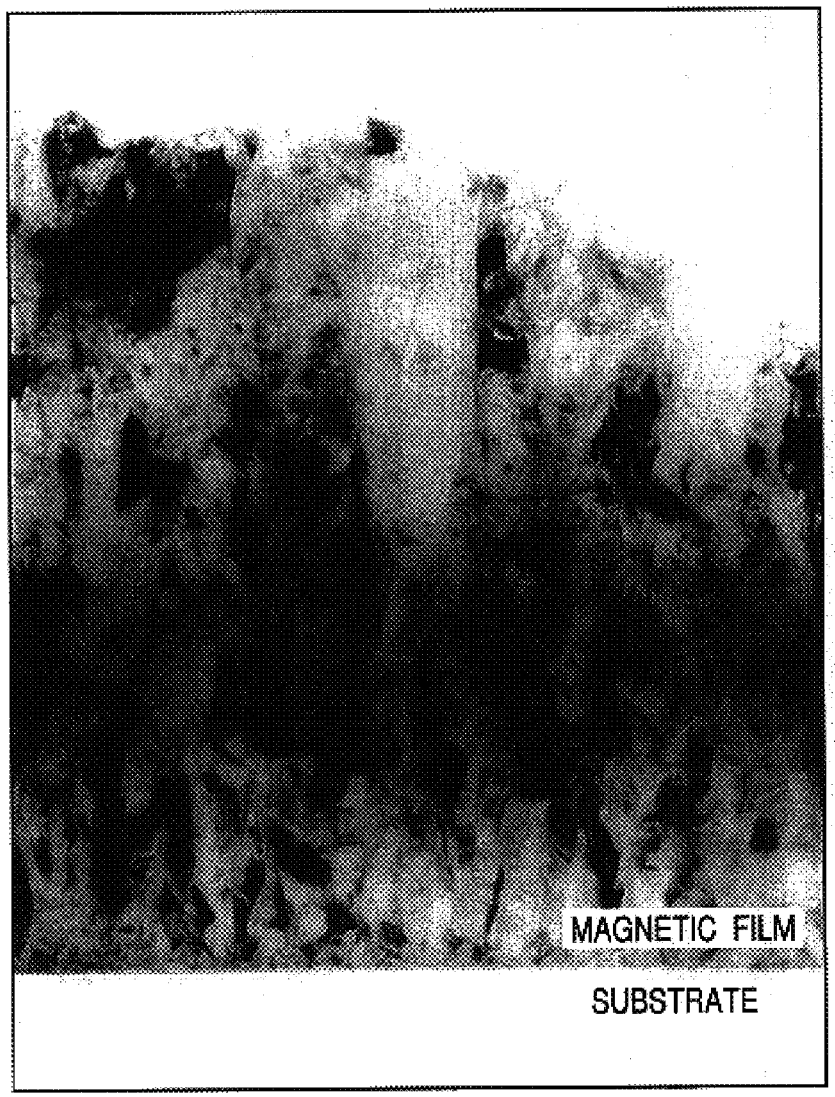
FIG. 4 shows a cross sectional TEM image of a plated magnetic film manufactured according to the method of the present invention.
Figure 5:
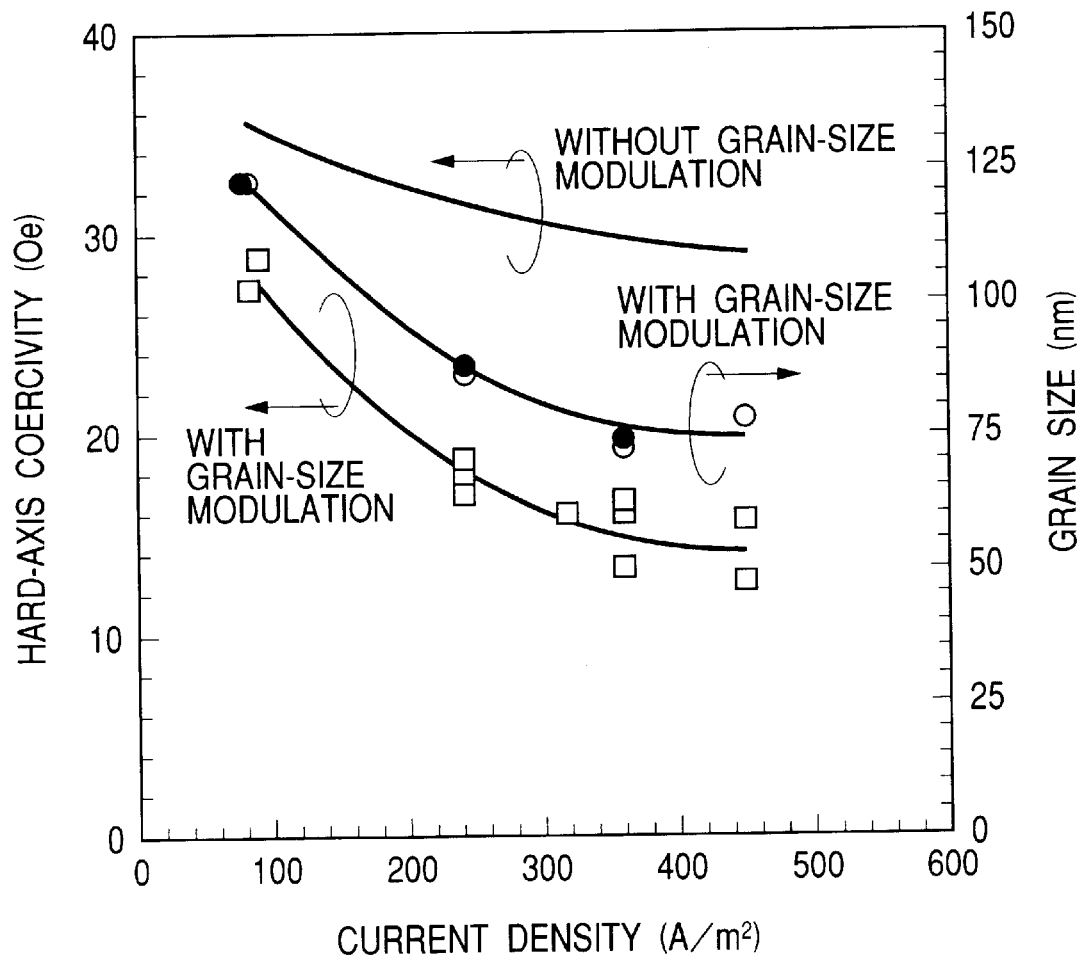
FIG. 5 is a graph illustrating current-density-dependency of hard-axis coercivity and of crystal grain size in the vicinity of a film surface.

FIGS. 3A to 3C show TEM images of the vicinity of surfaces of plated films manufactured at different current densities. FIG. 4 is a cross sectional TEM image of the vicinity of a boundary between a plated film and a substrate, for a plated film formed at a current density of 450 A/m$^2$. FIG. 5 shows the relationship between magnetization hard-axis coercivity (Hch) and crystal grain size in the surface vicinity of these plated films, and this will now be explained. As can be seen from FIGS. 3A to 3C and 5, with an increase in the current density from 50 A/m$^2$ to 450 A/m$^2$, the crystal grain size decreased from 120 nm to 80 nm. In contrast, for all of the plated films, irrespective of the current density they were manufactured at, the crystal grain size at the boundary between the substrate and the plated film was very fine, at about 20 nm. In addition, as can be seen from FIG. 4, with the growth of the plated film, the crystal grain size became larger, so that the crystal grain size was modulated in the direction of film thickness.

Further, as the crystal grain size in the surface vicinity decreased, Hch decreased from 30 Oe to 15 Oe. A plated film manufactured without any potential change during film formation was compared with respect to Hch with the plated film of the present invention. While the Hch of the plated film manufactured without any potential change during film formation tended to decrease with an increase in the current density, which is similar to the case with the potential modulated, the range of such change was small, and even though the current density was changed from 50 to 450 A/m$^2$, the Hch changed only by about 5 Oe. It is therefore clear that, according to the method for producing the plated film of the present invention, the crystal grain size in the surface vicinity is made fine to an appropriate level and the Hch decreases. With respect to Bs, it was confirmed by means of a vibrating sample magnetometer (VSM) that each plated film of the present embodiment had a Bs of 2.0 T.

Further, a corrosion resistance test was conducted for these plated films, and the results were compared with those of a conventional magnetic pole material. It was confirmed that these plated films had almost the same corrosion resistance as 46 permalloy ($Ni_{46}Fe_{54}$).

Moreover, when X-ray diffraction analysis (XRD) was conducted for these plated films, regardless of the value of current density, all plated films manufactured under this condition exhibited an extremely strong peak of the (110)-face of the body-centered cubic (bcc) phase. Thus, their crystal structures were substantially bcc. Since the magnetocrystalline anisotropy energy of magnetic film having a bcc structure is large, an anisotropic contribution to soft magnetic properties becomes more remarkable as the crystal grain size becomes larger. Therefore, it is considered that by applying a high current density at the time of plating, the crystal grain size of the initial plated film becomes fine, and as the result of further modulation in the direction of film thickness, Hc reduction is enabled.

In the light of the above findings, it is clear that application of high current density in conducting plating enables the crystal grain size of the plated film to be controlled. As a result, even in an alloy composition area in which it was conventionally difficult to obtain soft magnetic properties, the present invention enables obtainment of an excellent soft magnetic property. The reasons for this are considered to be those outlined below.

In the process of forming a thin film, there exist a crystal nucleation process and a crystal growth process. In order to make the crystal grain size fine, it is necessary that the nucleation process should be dominant. In the electroplating method, overvoltage at the time of film formation exerts a great influence, and thus the larger the overvoltage, the easier it is for the crystal nucleation process to be dominant.

As a method for controlling the overvoltage, in addition to the method of applying a high current density and enhancing potential at the initial stage of plating, as described in the present invention, the plating bath concentration or current waveform also exerts a great influence. For instance, since the resistance of the plating bath is increased by thinning the electrolyte concentration, when the plating current is kept constant, the potential at the time of film formation can be changed to a high potential depending on the plating bath concentration to enable the proportion of crystal nucleation to be increased. Therefore, it can be expected that the crystal grain size will be made even finer. In addition, when pulse current is used as the current waveform, it is possible to change the ratio of crystal nucleation to crystal growth. Besides the crystal grain size, it is effective as a method for modulating the crystal grain size in the course of film formation, as shown in the upper right schematic view of FIG. 6.

Figure 6:
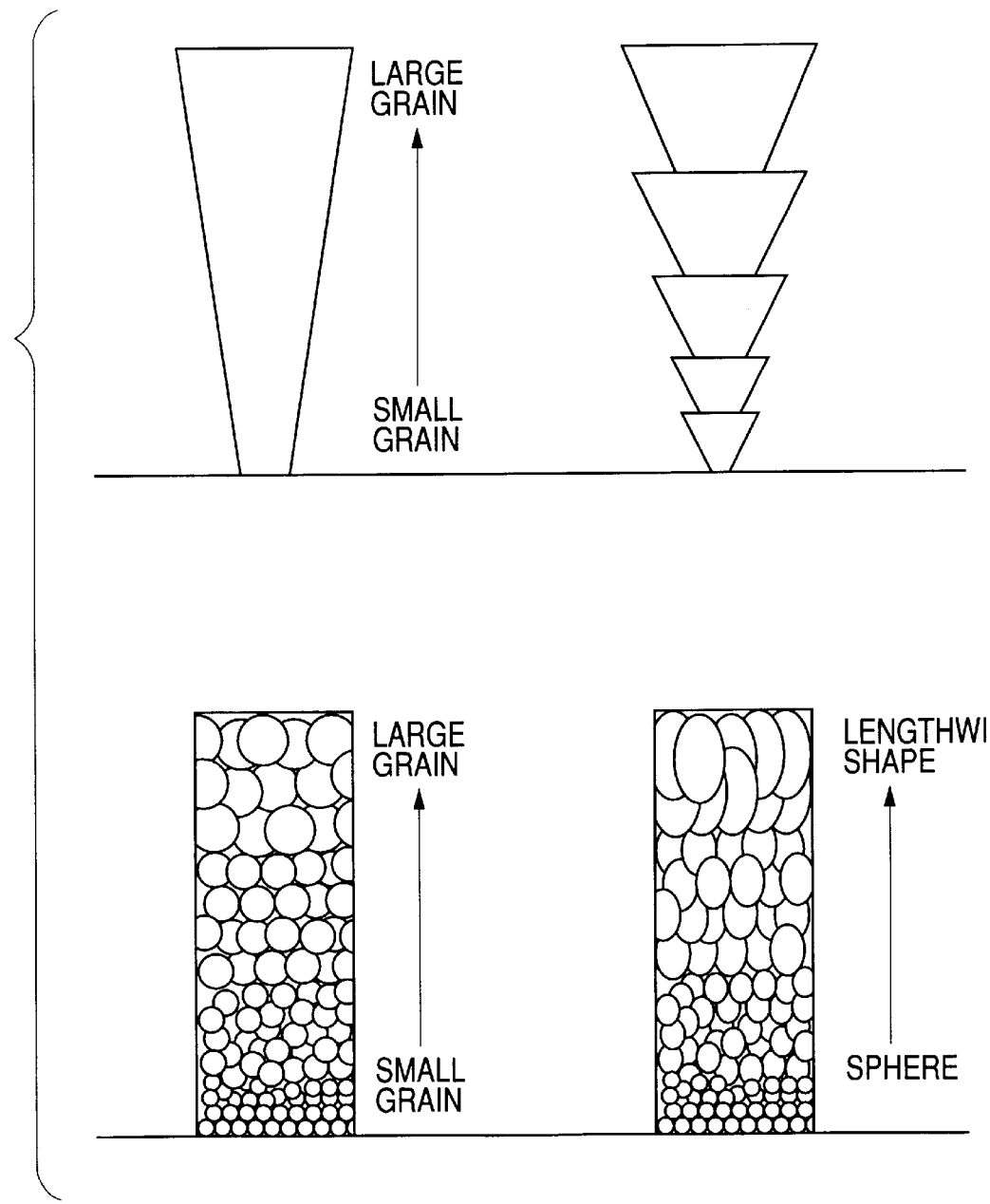
FIG. 6 is a schematic view illustrating a structure having crystal grain size modulated in the direction of film thickness.

FIG. 6 shows embodiments of a structure wherein the crystal grain size was modulated in the direction of film thickness. As shown in this embodiment, whether the crystal grain size increases continuously or on a step-by-step basis, or the crystal grain is elongated in the direction of film thickness, the same effect as that of the present invention can be obtained.

Embodiment 2

Figure 7:
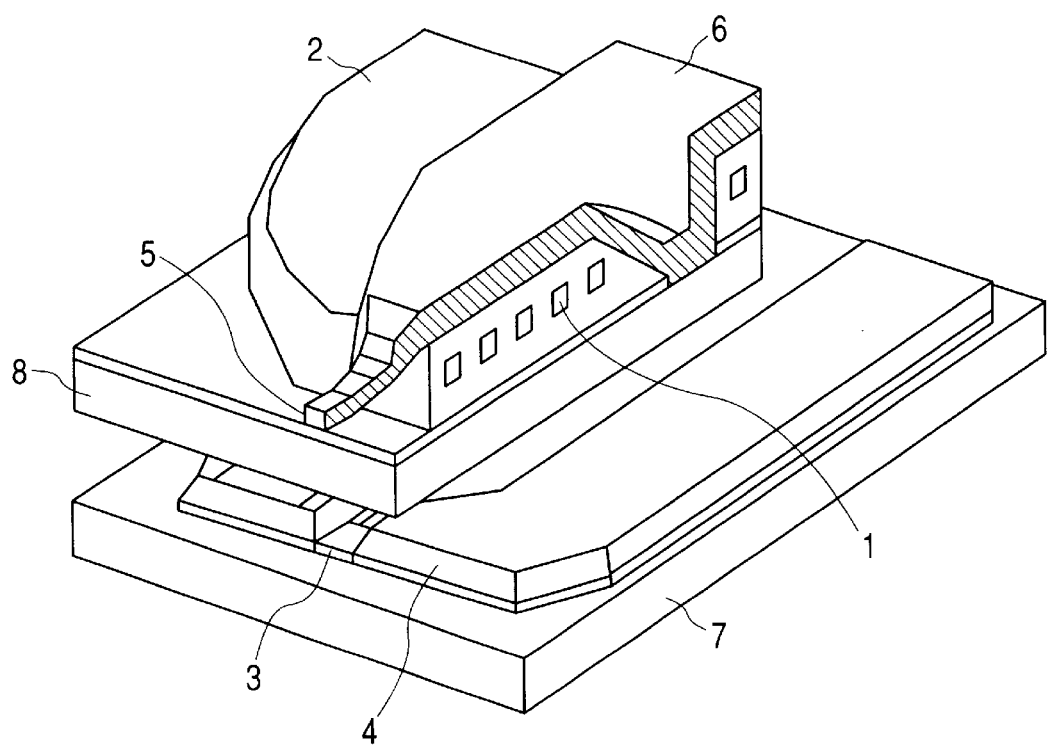
FIG. 7 is a schematic diagram illustrating a longitudinal recording magnetic head in an embodiment of the present invention.

FIG. 7 is a perspective view and a cross-sectional view illustrating a construction of a magnetic head fabricated in the same manner as Embodiment 1. (however, the rate of magnification of the figure is not uniform). The magnetic head in FIG. 7 is a thin film magnetic head with write and read elements.

Referring to the figure, a fabrication process of the thin film magnetic head will now be described. On a substrate, a lower shield 7 was formed, on top of which a magnetoresistive element 3 and an electrode 4 were formed, thereby forming a reading head. After a lower magnetic core 8 which also serves as an upper shield disposed on the reading head was prepared, a magnetic gap was formed. A tip portion 5 of an upper magnetic core and a coil 1 were each formed, and thereafter a rear portion 6 of the upper magnetic core, connected to the lower magnetic core 8, was formed, thereby fabricating a recording head.

In this process, the tip and rear portions 5 and 6 of the upper magnetic core constituting the recording head were formed by a frame plating method using the aforementioned plating bath of Embodiment 1 of the present invention. After formation, they were subjected to heat treatment for 1 hour at a treatment temperature of 230° C. with an impressed magnetic field of 160 kA/m (2 kOe) in the direction of the recording track width. The formed upper magnetic core did not exhibit any corrosion in the fabrication process of the magnetic head, and thus had excellent corrosion resistance.

The magnetic head fabricated in the above manner was incorporated into a magnetic disk apparatus and recording performance was evaluated. The result showed that an excellent overwrite property was obtained. Although an explanation on a detailed structure of the magnetic disk apparatus is omitted herein, the thin film magnetic head fabricated in this Embodiment was incorporated into a magnetic disk apparatus having the same structure as a conventional magnetic disk apparatus, as a write element of thin film magnetic head with write and read elements, so as to constitute the magnetic disk apparatus.

EFFECT OF THE INVENTION

As described above, it was difficult for a Co—Ni—Fe soft magnetic material film having a high Bs of 2.0 T or more manufactured by the conventional method to obtain an excellent soft magnetic property due to its large Hc. However, according to the present invention, Hc can be reduced to 15 Oe while maintaining Bs at not less than 2.0 T. The method of the present invention can also be applied to a Co—Ni—Fe alloy composition having an even higher Bs. By mounting a thin film magnetic head using the soft magnetic material film as a magnetic core, it is possible to manufacture a magnetic disk apparatus having an areal recording density of 100 Gb/in$^2$ or more.

What is claimed is:

1. A thin film magnetic head comprising:

a lower magnetic core formed above a substrate;

an upper magnetic core which is opposed to the lower magnetic core through a magnetic gap at a tip portion, and connected to the lower magnetic core at a rear portion; and a coil magnetically connected to a magnetic circuit formed by the lower and upper magnetic cores, wherein at least a part of the lower and/or the upper magnetic core contains Co, Ni, and Fe, and wherein the grain size of the crystal grains of the thin film magnetic head is modulated in a film thickness direction such that grains nearer to the substrate side of a magnetic film have a smaller grain size than that of grains nearer to the surface side thereof.

2. The thin film magnetic head according to claim 1, wherein the plated magnetic film comprises not less than 25% by weight of Fe, not greater than 80% by weight of Co, and not greater than 20% by weight of Ni, and a crystal structure of the magnetic film is substantially a body-centered cubic structure.

3. The thin film magnetic head according to claim 2, wherein a saturation magnetic flux density of the plated magnetic film is higher than 2.0 T.

4. The thin film magnetic head according to claim 1, wherein a saturation magnetic flux density of the plated magnetic film is higher than 2.0 T.

5. A method of fabricating a thin film magnetic head comprising the steps of:

forming a lower magnetic core above a substrate;

forming a coil; and forming an upper magnetic core which is opposed to the lower magnetic core through a magnetic gap film at a tip portion, connected to the lower magnetic core at a rear portion, and is magnetically connected to the coil together with the lower magnetic core, wherein, in the step of forming the lower magnetic core and/or the step of forming the upper magnetic core, a plated magnetic film containing Co, Ni and Fe is formed, wherein the grain size of the thin film magnetic head is modulated in a film thickness direction, such that grains nearer to the substrate side of the magnetic film have a smaller grain size than that of grains nearer to the surface side thereof.

6. The method of fabricating a thin film magnetic head according to claim 5, wherein a plating current has an average current density of 50 to 1000 A/m$^2$ in forming of the plated magnetic film.

7. The method of fabricating a thin film magnetic head according to claim 5, wherein a plating potential is, in particular, high at an initial stage of forming the plated magnetic film.

8. The method of fabricating a thin film magnetic head according to claim 5, wherein a current value and/or a potential of plating current are/is continuously, gradually, or periodically modulated in forming of the plated magnetic film.

* * * * *